(12) United States Patent
Huangfu et al.

(10) Patent No.: US 12,475,050 B2
(45) Date of Patent: Nov. 18, 2025

(54) CACHE-COHERENT INTERCONNECT BASED NEAR-DATA-PROCESSING ACCELERATOR

(71) Applicant: Samsung Electronics Co., Ltd., Suwon-si (KR)

(72) Inventors: Wenqin Huangfu, San Jose, CA (US); Krishna T. Malladi, San Jose, CA (US); Andrew Chang, Los Altos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/834,896

(22) Filed: Jun. 7, 2022

(65) Prior Publication Data

US 2023/0281128 A1    Sep. 7, 2023

Related U.S. Application Data

(60) Provisional application No. 63/316,399, filed on Mar. 3, 2022.

(51) Int. Cl.
*G06F 12/08* (2016.01)
*G06F 9/52* (2006.01)
(Continued)

(52) U.S. Cl.
CPC ........... *G06F 12/0828* (2013.01); *G06F 9/52* (2013.01); *G06F 12/0831* (2013.01)

(58) Field of Classification Search
CPC .. G06F 12/08; G06F 12/0828; G06F 12/0831; G06F 9/52; G06F 3/06;
(Continued)

(56) References Cited

U.S. PATENT DOCUMENTS

| 9,946,659 | B2 | 4/2018 | Dittmann |
| 10,185,499 | B1 | 1/2019 | Wang et al. |

(Continued)

FOREIGN PATENT DOCUMENTS

| EP | 3896574 | A1 | 10/2021 | |
| EP | 3913489 | A1 * | 11/2021 | ........... G06F 13/287 |
| WO | 2019076442 | A1 | 4/2019 | |

OTHER PUBLICATIONS

J. Feehrer et al., "Coherency Hub Design for Multisocket Sun Servers with CoolThreads Technology," in IEEE Micro, vol. 29, No. 4, pp. 36-47, Jul.-Aug. 2009.*

(Continued)

*Primary Examiner* — Pierre Michel Bataille
(74) *Attorney, Agent, or Firm* — Renaissance IP Law Group LLP

(57) ABSTRACT

A memory system is disclosed. The memory system may include a first cache-coherent interconnect memory module and a second cache-coherent interconnect memory module. A cache-coherent interconnect switch may connect the first cache-coherent interconnect memory module, the second cache-coherent interconnect memory module, and a processor. A processing element may process a data stored on at least one of the first cache-coherent interconnect memory module and the second cache-coherent interconnect memory module.

21 Claims, 9 Drawing Sheets

(51) Int. Cl.
  *G06F 12/0817* (2016.01)
  *G06F 12/0831* (2016.01)
(58) Field of Classification Search
  CPC .... G06F 3/0659; G06F 12/04; G06F 15/7821;
    G06F 3/067; G06F 12/0292; G06F
    12/0284; G06F 3/061; G06F 12/0835;
    G06F 12/0607; G06F 2212/1016; G06F
    2212/1048; G06F 2212/205
  See application file for complete search history.

(56) References Cited

U.S. PATENT DOCUMENTS

| | | | |
|---|---|---|---|
| 10,203,878 | B2 | 2/2019 | Haller et al. |
| 10,430,353 | B2 | 10/2019 | Hong et al. |
| 10,565,133 | B2 | 2/2020 | Gopal |
| 10,649,927 | B2 | 5/2020 | Raghava et al. |
| 10,698,842 | B1 | 6/2020 | Dastidar et al. |
| 10,802,995 | B2 | 10/2020 | Singh et al. |
| 10,884,672 | B2 | 1/2021 | Song et al. |
| 11,204,867 | B2 | 12/2021 | Agarwal et al. |
| 11,573,898 | B2* | 2/2023 | Passint ................ G06F 12/0831 |
| 12,204,441 | B2* | 1/2025 | Raghava .............. G06F 12/126 |
| 2017/0344479 | A1 | 11/2017 | Boyer et al. |
| 2019/0102311 | A1 | 4/2019 | Gupta et al. |
| 2021/0224213 | A1 | 7/2021 | Raj et al. |
| 2021/0311900 | A1* | 10/2021 | Malladi ............... G06F 13/4068 |
| 2021/0349837 | A1 | 11/2021 | Huangfu et al. |
| 2021/0373951 | A1* | 12/2021 | Malladi ............... G06F 13/1668 |
| 2021/0374056 | A1 | 12/2021 | Malladi et al. |
| 2021/0389880 | A1 | 12/2021 | Bernat et al. |
| 2022/0035742 | A1* | 2/2022 | Schumacher ....... G06F 12/0815 |
| 2022/0114098 | A1* | 4/2022 | Das Sharma ....... G06F 12/0857 |
| 2022/0114099 | A1* | 4/2022 | Blankenship ....... G06F 13/1673 |
| 2022/0164286 | A1* | 5/2022 | Jeong ................. G06F 12/0806 |
| 2022/0269433 | A1* | 8/2022 | Pal ...................... G06F 13/4027 |
| 2023/0044342 | A1* | 2/2023 | Wilkinson .......... G06F 12/0882 |
| 2023/0114164 | A1* | 4/2023 | Pal ........................... G06F 9/52 |
| | | | 711/118 |
| 2023/0244598 | A1* | 8/2023 | Roberts .............. G06F 12/0238 |
| | | | 711/154 |

OTHER PUBLICATIONS

M. D. Hill, B. Falsafi, D. A. Wood and S. S. Mukherjee, "Coherent Network Interfaces for Fine-Grain Communication," 23rd Annual International Symposium on Computer Architecture (ISCA'96), Philadelphia, PA, USA, 1996, pp. 247-258.*

X. Hu, Y. Zhang, L. Mao, J. Shen and Z. Xing, "A Noc Centric Low Overhead Multi-chip Interconnection Technology," 2021 IEEE 23rd Int Conf on High Performance Computing & Communications; Cloud & Big Data Systems & Application, China, 2021, pp. 603-610.*

S. Van Doren, "Abstract—HOTI 2019: Compute Express Link," 2019 IEEE Symposium on High-Performance Interconnects (HOTI), Santa Clara, CA, USA, 2019, pp. 18-18.*

A. Charlesworth, "The Sun Fireplane System Interconnect," SC '01: Proceedings of the 2001 ACM/IEEE Conference on Supercomputing, Denver, CO, USA, 2001, pp. 2-2.*

T. Le, Z. Zhang and Z. Zhu, "POMI: Polling-Based Memory Interface for Hybrid Memory System," 2021 IEEE 39th International Conference on Computer Design (ICCD), Storrs, CT, USA, 2021, pp. 447-455.*

C. Lee et al., "NVDIMM-C: A Byte-Addressable Non-Volatile Memory Module for Compatibility with Standard DDR Memory Interfaces," 2020 IEEE International Symposium on High Performance Computer Architecture (HPCA), San Diego, CA, USA, 2020, pp. 502-514.*

Ahmed, Nauman et al., "A comparison of seed-and-extend techniques in modern DNA read alignment algorithms", 2016 IEEE International Conference on Bioinformatics and Biomedicine (BIBM), Shenzhen, China, 2016, pp. 1421-1428.

Ahmed, Nauman et al., "Heterogeneous hardware/software acceleration of the BWA-MEM DNA alignment algorithm", 2015 IEEE/ACM International Conference on Computer-Aided Design (ICCAD), Austin, TX, USA, 2015, pp. 240-246.

Alser, Mohammed et al., "Accelerating Genome Analysis: A Primer on an Ongoing Journey," in IEEE Micro, vol. 40, No. 5, pp. 65-75, Sep. 1-Oct. 2020.

Alser, Mohammed et al., "Shouji: a fast and efficient pre-alignment filter for sequence alignment", Bioinformatics, vol. 35, Issue 21, Nov. 1, 2019, pp. 4255-4263.

Cadenelli, Nicola et al., "Considerations in using OpenCL on GPUs and FPGAs for throughput-oriented genomics workloads", Future Generation Computer Systems, vol. 94, May 2019, pp. 148-159.

Chang, Mau-Chung Frank et al., "The SMEM Seeding Acceleration for DNA Sequence Alignment", 2016 IEEE 24th Annual International Symposium on Field-Programmable Custom Computing Machines (FCCM), Washington, DC, USA, 2016, pp. 32-39.

Chikhi, Rayan et al., "Space-efficient and exact de Bruijn graph representation based on a Bloom filter", Algorithms Molecular Biology 8, 1 (2013), 22.

Compute Express Link. 2020. Compute Express Link 2.0 White Paper. https://www.computeexpresslink.org/.

Compute Express Link. 2020. Compute Express Link Specifications—Revision 2.0. https://www.computeexpresslink.org/download-the-specification.

Cong, Jason et al., "AIM: accelerating computational genomics through scalable and noninvasive accelerator-interposed memory", MEMSYS '17: Proceedings of the International Symposium on Memory Systems, Oct. 2017, pp. 3-14.

Doren, S Van, "Abstract—HOTI 2019: Compute Express Link", 2019 IEEE Symposium on High-Performance Interconnects (HOTI), Santa Clara, CA, USA, 2019, pp. 18-18.

Duarte, Filipa, "A Cache-Based Hardware Accelerator for Memory Data Movements", Doctoral dissertation, Delft University of Technology, Oct. 13, 2008.

European Extended Search Report for Application No. 23150940.7, mailed Jul. 6, 2023.

Farmahini-Farahani, Amin et al., "NDA: Near-DRAM acceleration architecture leveraging commodity DRAM devices and standard memory modules", 2015 IEEE 21st International Symposium on High Performance Computer Architecture (HPCA), Burlingame, CA, USA, 2015, pp. 283-295.

Genetic Science Learning Center, Learn.Genetics,Genetics Science Learning Center, "Your Doctor's New Genetic Tools", 2016, http://learn.genetics.utah.edu/content/precision/example/.

Gries, Matthias et al., "Performance Evaluation and Feasibility Study of Near-data Processing on DRAM Modules (DIMM-NDP) for Scientific Applications", Doctoral dissertation, Huawei Technologies Duesseldorf GmbH, Munich Research Center (MRC), 2019.

Guan, Wei-jie et al., "Clinical Characteristics of Coronavirus Disease 2019 in China", New England Journal of Medicine (2020), Apr. 30, 2020.

Huangfu, Wenqin et al., "Medal: Scalable DIMM based Near Data Processing Accelerator for DNA Seeding Algorithm", Micro '52: Proceedings of the 52nd Annual IEEE/ACM International Symposium on Microarchitecture, Oct. 2019, pp. 587-599.

Huangfu, Wenqin et al., "Nest: DIMM based near-data-processing accelerator for K-mer counting", ICCAD '20: Proceedings of the 39th International Conference on Computer-Aided Design, Nov. 2020, Article No. 28, pp. 1-9.

Huangfu, Wenqin et al., "Radar: a 3D-reRAM based DNA alignment accelerator architecture", DAC '18: Proceedings of the 55th Annual Design Automation Conference, Jun. 2018, Article No. 59, pp. 1-6.

Joardar, Biresh Kumar et al., "NoC-enabled software/hardware co-design framework for accelerating k-mer counting", NOCS '19: Proceedings of the 13th IEEE/ACM International Symposium on Networks-on-Chip, Oct. 2019, Article No. 4, pp. 1-8.

Kaplan, Roman et al., "BioSEAL: In-Memory Biological Sequence Alignment Accelerator for Large-Scale Genomic Data", SYSTOR

(56) References Cited

OTHER PUBLICATIONS

'20: Proceedings of the 13th ACM International Systems and Storage Conference, May 2020, pp. 36-48.
Kaplan, Roman et al., "RASSA: Resistive Prealignment Accelerator for Approximate DNA Long Read Mapping", IEEE Micro, vol. 39, No. 4, pp. 44-54, Jul. 1-Aug. 2019.
Kim, Jeremie S et al., "GRIM-Filter: Fast seed location filtering in DNA read mapping using processing-in-memory technologies", BMC Genomics 19 (Suppl 2), 89 (2018), p. 23-40.
Langmead, Ben et al., "Fast gapped-read alignment with Bowtie 2", Nature Methods 9, 357-359, 2012.
Leidel, John D et al., "HMC-Sim-2.0: A Simulation Platform for Exploring Custom Memory Cube Operations", 2016 IEEE International Parallel and Distributed Processing Symposium Workshops (IPDPSW), Chicago, IL, USA, 2016, pp. 621-630.
Li, Heng, "Aligning sequence reads, clone sequences and assembly contigs with BWA-MEM", arXiv preprint arXiv:1303.3997 (2013).
Lu, Roujian et al., "Genomic characterisation and epidemiology of 2019 novel coronavirus: implications for virus origins and receptor binding", The Lancet (2020), vol. 395, Issue 10224, Feb. 22-28, 2020, pp. 565-574.
Ma, Xingliang et al., "Genome Editing for Global Food Security", Trends in Biotechnology, vol. 36, Issue 2, Feb. 2018, pp. 123-127.
Mcvicar, Nathaniel et al., "K-Mer Counting Using Bloom Filters with an FPGA-Attached HMC", 2017 IEEE 25th Annual International Symposium on Field-Programmable Custom Computing Machines (FCCM), Napa, CA, USA, 2017, pp. 203-210.
Merker, Jason D et al., "Long-read genome sequencing identifies causal structural variation in a Mendelian disease", Genetics in Medicine 20, 1 (2018), 159-163.
Mittal, Millind et al., "The Perfect Trifecta. NVMe, CXL and Persistent Memory", Storage Networking Industry Association (SNIA), Jan. 23, 2020.
Nag, Anirban et al., "GenCache: Leveraging In-Cache Operators for Efficient Sequence Alignment", Micro '52: Proceedings of the 52nd Annual IEEE/ACM International Symposium on Microarchitecture, Oct. 2019, pp. 334-346.
Pinto, Christian et al., "ThymesisFlow: A Software-Defined, HW/SW co-Designed Interconnect Stack for Rack-Scale Memory Disaggregation", 2020 53rd Annual IEEE/ACM International Symposium on Microarchitecture (Micro), Athens, Greece, 2020, pp. 868-880.
Ramachandran, Anand et al., "FPGA accelerated DNA error correction", 2015 Design, Automation & Test in Europe Conference & Exhibition (DATE), Grenoble, France, 2015, pp. 1371-1376.
Sharma, Debendra Das, "Understanding Compute Express Link a Cache-coherent Interconnect", Proceedings of Storage Developers Conference. Sep. 22, 2020.
Shendure, Jay et al., "Next-generation DNA sequencing", Nature Biotechnology 26, 10 (2008), pp. 1135-1145.
Singh, Gagandeep et al., "Near-Memory Computing Past, Present, and Future", arXiv: 1908.02640, Aug. 7, 2019.
Vijayaraghavan, Thiruvengadam et al., "MPU-BWM: Accelerating Sequence Alignment", in IEEE Computer Architecture Letters, vol. 17, No. 2, pp. 179-182, Jul. 1-Dec. 2018.

\* cited by examiner

CACHE-COHERENT INTERCONNECT BASED NEAR-DATA-PROCESSING ACCELERATOR

RELATED APPLICATION DATA

This application claims the benefit of U.S. Provisional Patent Application Ser. No. 63/316,399, filed Mar. 3, 2022, which is incorporated by reference herein for all purposes.

FIELD

The disclosure relates generally to memory systems, and more particularly to memory systems including accelerators for near-data processing.

BACKGROUND

Some problems, such as genomics, may involve large amounts of data. When the data is stored in a memory system, moving the data from memory to a processor to process the data may experience a bottleneck. In addition, using a processor to process the data may prevent the processor from carrying out other operations.

A need remains for a way to process data in a memory system without moving the data to the processor.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
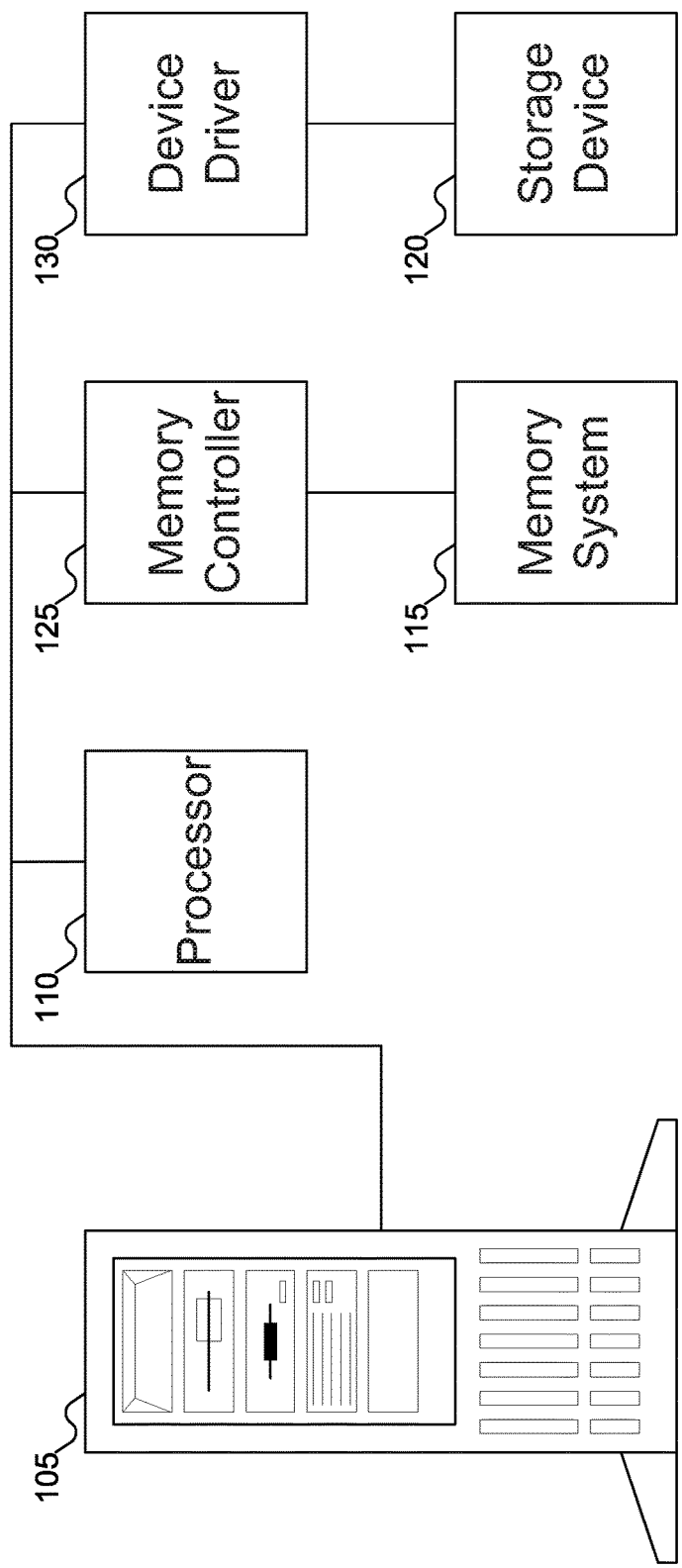
FIG. 1 shows a machine configured to perform near data processing in a memory system, according to embodiments of the disclosure.

Embodiments of the disclosure may include a memory system. Compute Express Link (CXL) memory modules may be connected to a host processor via a CXL switch. A processing element in the memory system may process data stored on at least one of the CXL memory modules.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Genomics analysis is of increasing importance. Genomics analysis may be used to develop precise medicines, design drugs targeted for particular conditions, study evolution, improve crops to include particular phenotypes, perform forensic analysis, or design gene therapies.

But genomics analysis may involve processing large amounts of data. The amount of bio-data to be processed is expected to be an order of magnitude greater than astronomical data or video data stored on the Internet. This data may be stored in a memory system.

Using a host processor to process the data may be inefficient, as significant data may be moved into memory to support host processing of the data, which may affect other operations being performed by the host processor. Near-data acceleration is another possibility. But near-data acceleration may also involve communication and orchestration delays. In either case, memory access and bandwidth may become a bottleneck to performing genomics analysis.

Embodiments of the disclosure may perform near data processing within a memory system. A processing element may be located within, for example, a memory module. Using the Compute Express Link (CXL) protocol or some other cache-coherent interconnect protocol, data may be accessed from a memory module. The CXL or other cache-coherent interconnect protocol may provide data at a higher bandwidth than might be used to transfer data to the host processor. The processing element may be designed to perform specific near data processing tasks, and may therefore do so more efficiently than a generic processor executing commands. For example, in genomic analysis, there are only four bases: adenine (A), cytosine (C), guanine (G), and thymine (T). These four bases may be distinguished using only two bits of data, and therefore two-bit arithmetic may be used, which may be more efficient than performing arithmetic using a 32-bit or 64-bit processor.

Embodiments of the disclosure may extend to problems other than genomic analysis to be solved using near data processing: for example, graph processing or machine learning.

Embodiments of the disclosure may support memory expansion, even with memory modules that do not themselves include near data processing.

FIG. 1 shows a machine configured to perform near data processing in a memory system, according to embodiments of the disclosure. In FIG. 1, machine 105, which may also be termed a host or a system, may include processor 110, memory system 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory system 115. Memory system 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory system 115 may be a volatile or non-volatile memory, as desired. Memory system 115 may also be any desired combination of different memory types, and may be managed by memory controller 125. Memory system 115 may be used to store data that may be termed "short-term": that is, data not expected to be stored for extended periods of time. Examples of short-term data may include temporary files, data being used locally by applications (which may have been copied from other storage locations), and the like. Memory system 115 is discussed further with reference to FIGS. 3A-3B below.

Processor 110 and memory system 115 may also support an operating system under which various applications may be running. These applications may issue requests (which may also be termed commands) to read data from or write data to either memory system 115. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may each support any desired protocol or protocols, including, for example, the Non-Volatile Memory Express (NVMe) protocol. Different storage devices 120 may support different protocols and/or interfaces.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

Figure 2:
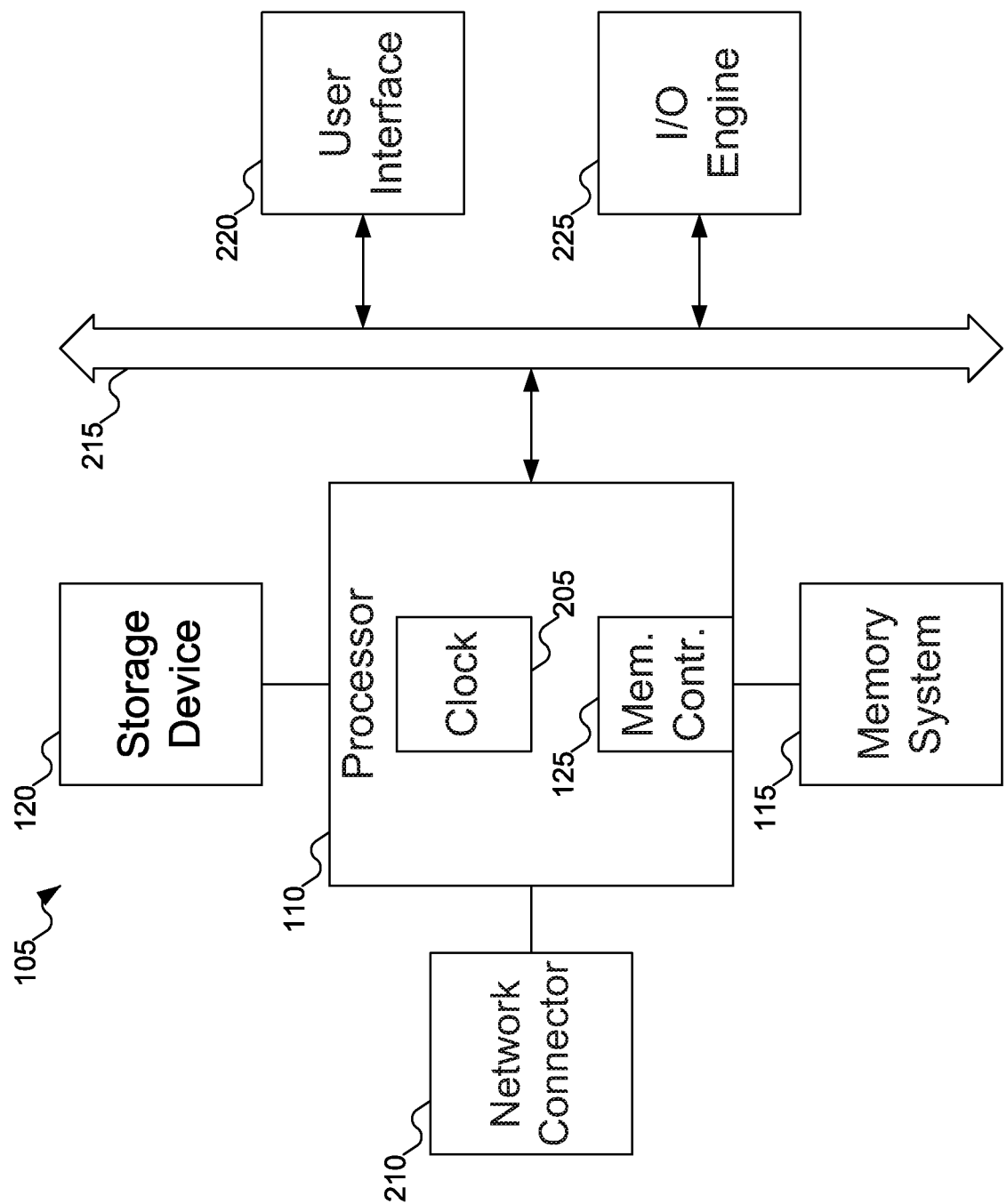
FIG. 2 shows details of the machine of FIG. 1, according to embodiments of the disclosure.

FIG. 2 shows details of the machine of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memory systems 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
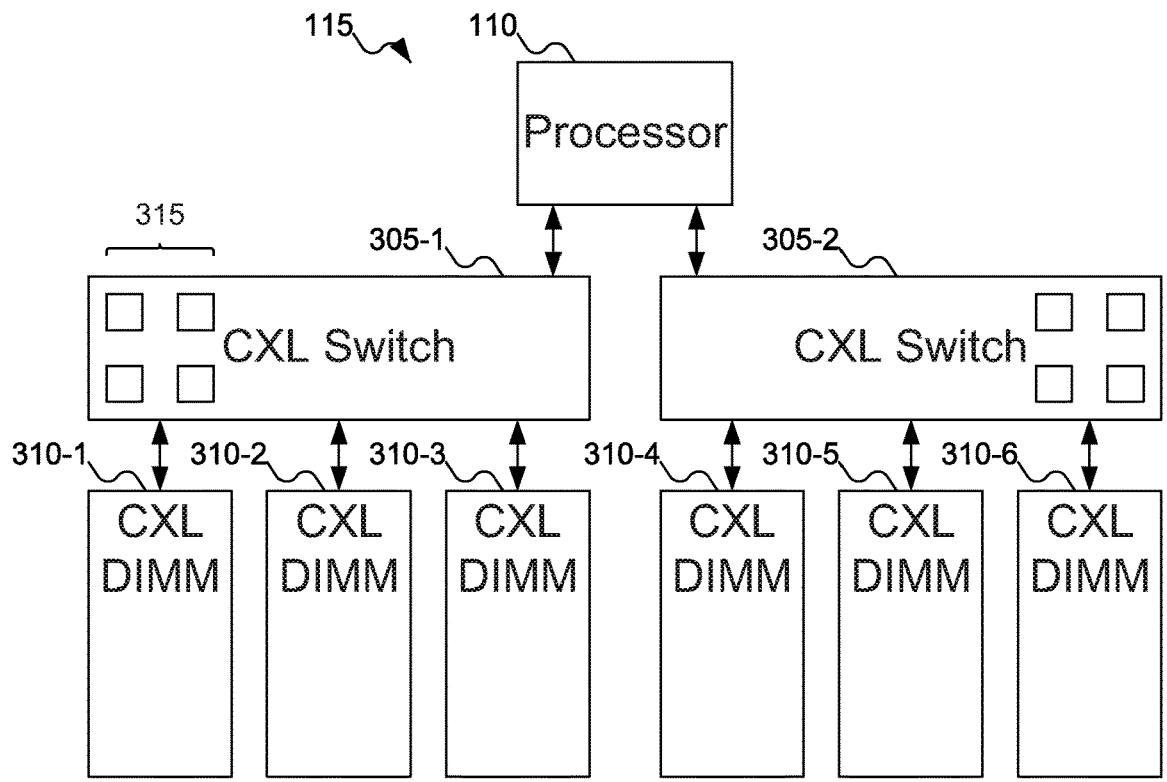
FIG. 3A shows details of the memory system of FIG. 1, according to some embodiments of the disclosure.

FIG. 3A shows details of memory system 115 of FIG. 1, according to some embodiments of the disclosure. In FIG. 3A, processor 110 may be connected to switches 305-1 and 305-2. In FIG. 3A, switches 305-1 and 305-2 (which may be referred to collectively as switches 305) may be cache-coherent interconnect switches: for example, switches 305-1 and 305-2 may be Compute Express Link (CXL) switches. Any further reference to CXL may be understood to generalize to any cache-coherent interconnect appropriate element: for example, a reference to a CXL memory module may be understood to include any cache-coherent interconnect memory module, or a reference to a CXL protocol may be understood to include any cache-coherent interconnect protocol. While FIG. 3A shows two CXL switches 305-1 and 305-2, embodiments of the disclosure may include any number of CXL switches.

CXL switches 305 may also be connected to CXL memory modules 310-1 through 310-6 (which may be referred to collectively as memory modules 310): CXL switch 305-1 may be connected to CXL memory modules 310-1 through 310-3, and CXL switch 305-2 may be connected to CXL memory modules 310-4 through 310-6. CXL memory modules 310 may be any desired type of memory modules: for example, CXL memory modules 310 may be Dual In-Line Memory Modules (DIMMs), and may be used as DRAM. While FIG. 3A shows each CXL switch 305 connected to three CXL memory modules 310 (and a total of six CXL memory modules 310), embodiments of the disclosure may include any number of CXL memory modules 310, and may have any number of CXL memory modules 310 connected to each CXL switch 305.

In FIG. 3A, CXL switches 305 may also include processing elements. For example, CXL switch 305-1 is shown as including processing elements 315. Processing elements 315 may perform near data processing of data stored in CXL memory modules 310. While FIG. 3A shows both CXL switches 305 including processing elements 305, embodiments of the disclosure may include processing elements 315 in some but not all of CXL switches 305.

CXL switches 305 and CXL memory modules 310 may be connected using CXL links. CXL links may offer a higher bandwidth than, for example, links connecting memory modules 310 with processor 110. As a result, processing elements 315 may be able to access data from CXL memory modules 310 faster than processor 110 may be able to access the same data.

Figure 3B:
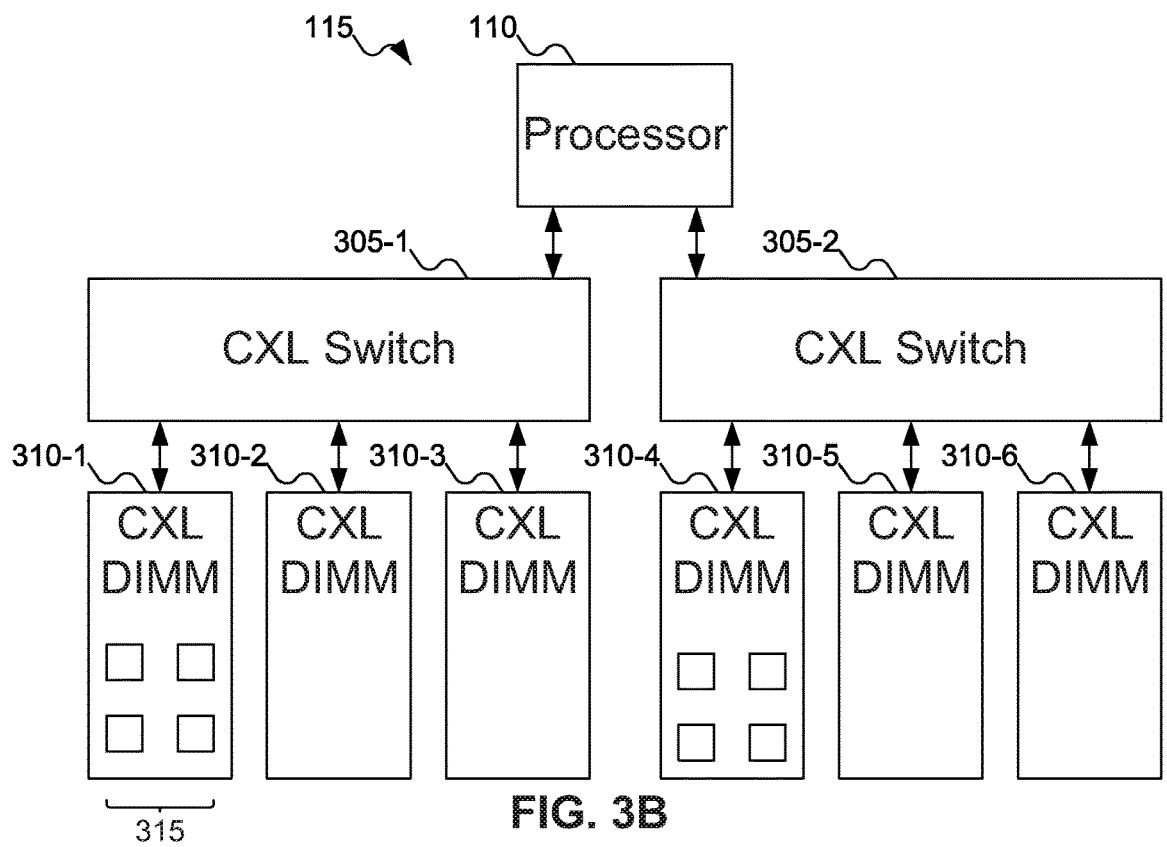
FIG. 3B shows details of the memory system of FIG. 1, according to other embodiments of the disclosure.

FIG. 3B shows details of memory system 115 of FIG. 1, according to other embodiments of the disclosure. In FIG. 3A, processor, CXL switches 305, and CXL memory modules 310 are similar to those of FIG. 3A. But instead of processing elements 315 being in CXL switches 305, processing elements 315 may be included in CXL memory modules 310.

Figure 4A:
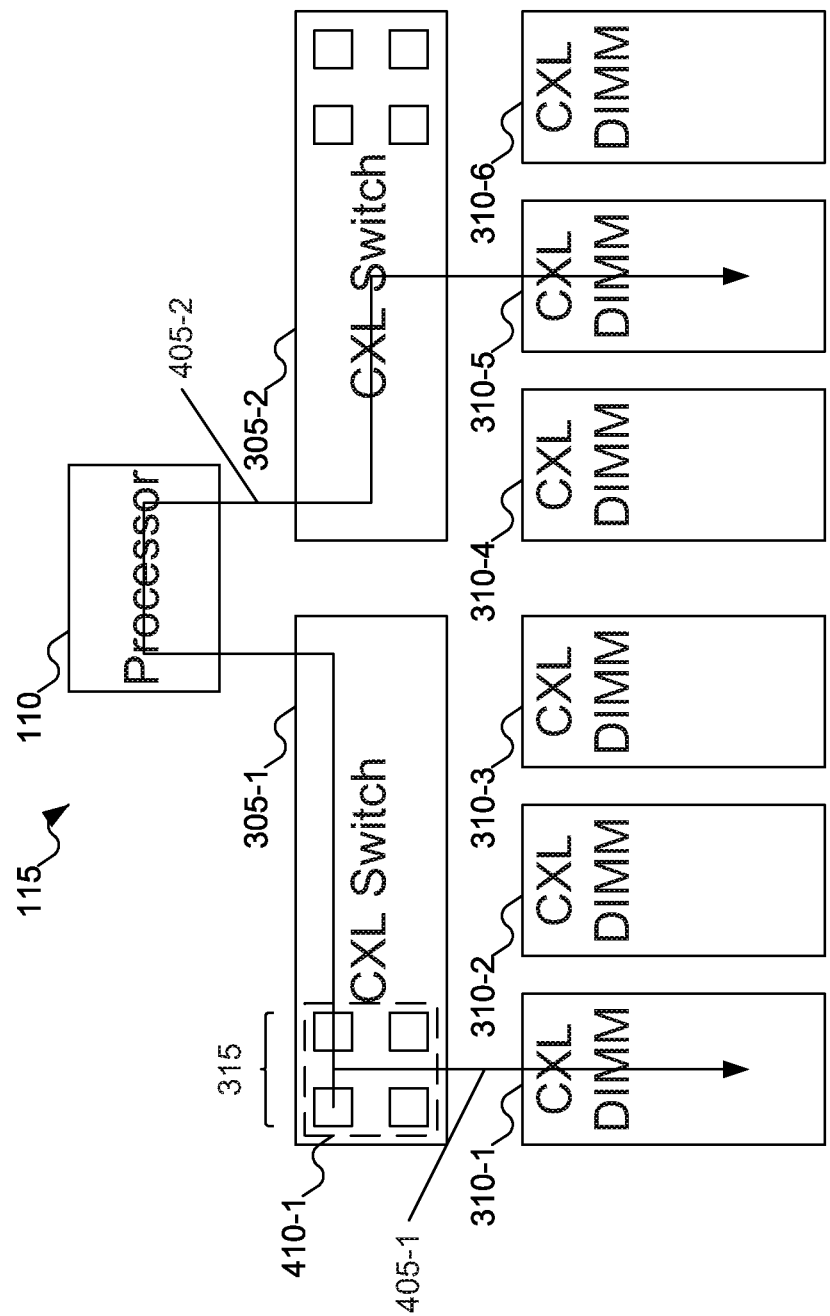
FIG. 4A shows how data may be accessed in the memory system of FIG. 3A, according to embodiments of the disclosure.

FIG. 4A shows how data may be accessed in memory system 115 of FIG. 3A, according to embodiments of the disclosure. In FIG. 4A, processing elements 315 in, for example, CXL switch 305-1 may access data from CXL memory module 310-1, as CXL memory module 310-1 is shown as connected to CXL switch 305-1, as shown by path 405-1. The same may be true for accessing data from other CXL memory modules 310-2 and 310-3 that are connected to CXL switch 305-1.

But processing elements 315 in CXL switch 305-1 may also access data from, for example, CXL memory module 310-5, even though CXL memory module 315-5 is not directly connected to CXL switch 305-1. For example, CXL switch 305-2 may be accessed from CXL switch 305-1 using processor 110. Since CXL memory module 310-5 may be connected to CXL switch 305-1, processing elements 315 in CXL switch 305-1 may access data from CXL memory module 310-5 using processor 110 and CXL switch 305-2, as shown by path 405-2.

In some embodiments of the disclosure, processing elements 315 may be directly included in switches 305. But in other embodiments of the disclosure, processing elements 315 may be included in an accelerator, such as accelerator 410-1. Accelerator 410-1 may be implemented directly as part of CXL switches 305, or accelerator 410-1 may implemented as a separate component that may be installed within or connected to CXL switches 305. Accelerator 410-1 may be implemented using a central processing unit (CPU) or some other processor (such as an field programmable gate array (FPGA), an application-specific integrated circuit (ASIC), or a system-on-a-chip (SoC)), a graphics processing unit (GPU), a general purpose GPU (GPGPU), a data processing unit (DPU), a neural processing unit (NPU), a network interface card (NIC), or a tensor processing unit (TPU), among other possibilities. Accelerator 410-1 is discussed further with reference to FIG. 5 below.

Figure 4B:
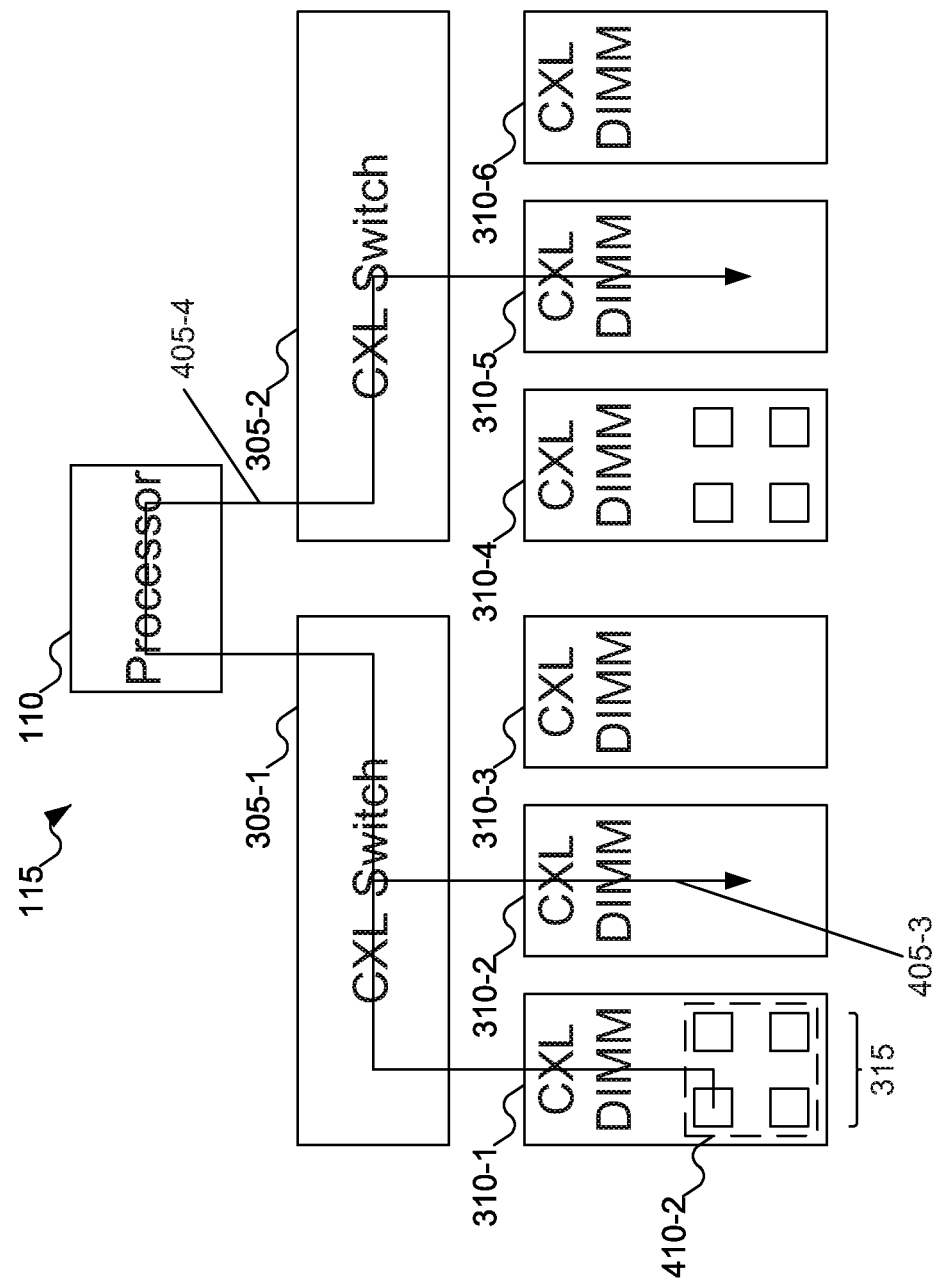
FIG. 4B shows how data may be accessed in the memory system of FIG. 3B, according to embodiments of the disclosure.

FIG. 4B shows how data may be accessed in memory system 115 of FIG. 3B, according to embodiments of the disclosure. In FIG. 4B, processing elements 315 may be implemented as part of CXL memory modules 310. As discussed above with reference to FIG. 4A, processing elements may be implemented as part of an accelerator, such as accelerator 410-2. (Accelerators 410-1 of FIG. 4A and 410-2 may be referred to collectively as accelerators 410.) As with accelerator 410-1 of FIG. 4A, accelerator 410-2 may be implemented directly as part of CXL memory modules 310, or accelerator 410-2 may implemented as a separate component that may be installed within or connected to CXL memory modules 310. Accelerator 410-2 may be implemented using a CPU or some other processor (such as an FPGA, an ASIC, or an SoC), a GPU, a GPGPU, a DPU, an NPU, an NIC, or a TPU, among other possibilities. Accelerator 410-2 is discussed further with reference to FIG. 5 below.

Obviously, processing elements 315 in CXL memory module 310-1 may access data from CXL memory module 310-1. Processing elements 315 in CXL memory module 310-1 may also access data from other CXL memory modules, such as CXL memory module 310-2, across CXL switch 305-1, as shown by path 405-3. And processing elements 315 in CXL memory module 310-1 may access data from other CXL memory modules, such as CXL memory module 310-5, that are not directly connected to the same CXL switch as CXL memory module 310-1 (in FIG. 4B, CXL switch 310-1), using processor 110 and CXL switch 305-2, as shown by path 405-4.

While memory system 115 of FIGS. 3A-4B focuses on using CXL memory modules 310, embodiments of the disclosure may also include other forms of storage that may be accessed using CXL. For example, embodiments of the disclosure may include CXL storage devices as well as CXL memory modules, which may offer additional storage despite possibly being separate from memory system 115.

Figure 5:
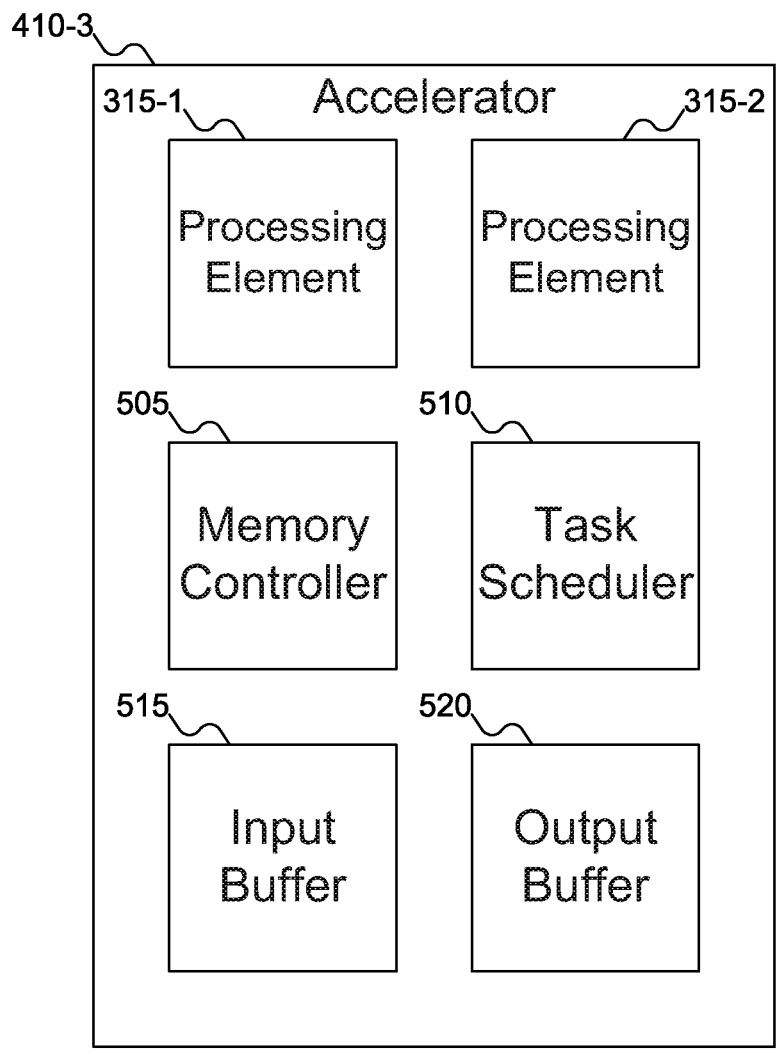
FIG. 5 shows details of the accelerator of FIGS. 4A-4B, according to embodiments of the disclosure.

FIG. 5 shows details of accelerator 410 of FIGS. 4A-4B, according to embodiments of the disclosure. In FIG. 5, accelerator may include processing elements 315, memory controller 505, task scheduler 510, input buffer 515, and output buffer 520. Memory controller 505 may manage requests of data from CXL memory modules 310 without having such requests be handled by processor 110 of FIG. 1 (or memory controller 125 of FIG. 1). Task scheduler may schedule tasks for execution on processing elements 310. Input buffer 515 may store data received as input (either from processor 110 of FIG. 1 as part of the request to execute the command, or from CXL memory modules 310 of FIGS. 3A-3B) for processing by the command. Processing elements 310 may read the data from input buffer 515 as part of executing the command. Finally, output buffer 520 may store data output by the command for writing into CXL memory modules 310 of FIGS. 3A-3B. Once the command is complete, processing elements 310 may store the data in output buffer 520 for later writing to one (or more) of CXL memory modules 310 of FIGS. 3A-3B; once the output is written and processor 110 of FIG. 1 is notified by processing elements 310 that the command has completed execution, processor 110 of FIG. 1 may access the output, either from where the output is ultimately written in CXL memory modules 310 of FIGS. 3A-3B or directly from output buffer 520.

Figure 6:
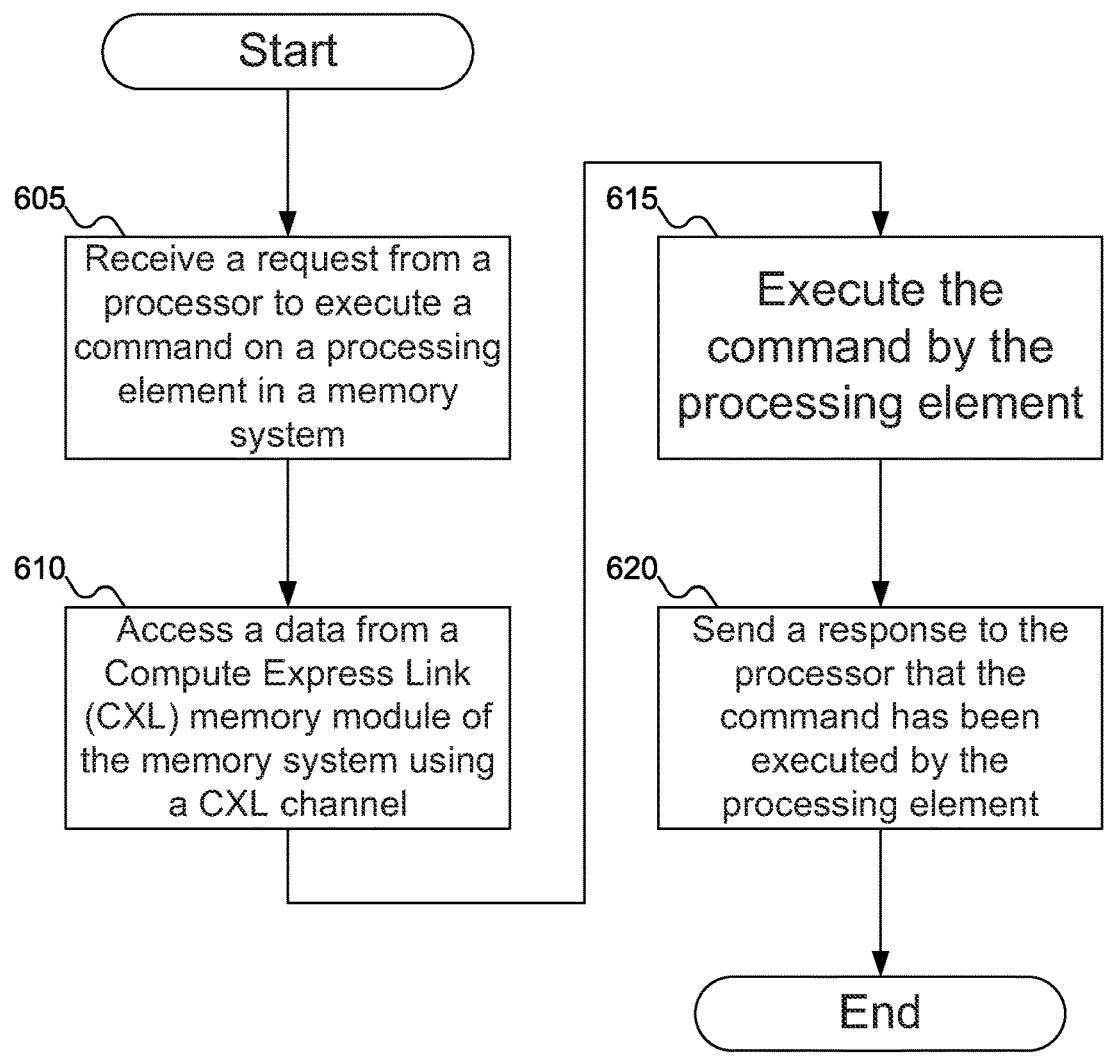
FIG. 6 shows a flowchart of an example procedure for performing near data processing in the memory systems of FIGS. 3A-3B, according to embodiments of the disclosure.

FIG. 6 shows a flowchart of an example procedure for performing near data processing in memory systems 115 of FIGS. 3A-3B, according to embodiments of the disclosure. In FIG. 6, at block 605, accelerators 410 of FIGS. 4A-4B (or processing elements 315 of FIGS. 3A-3B) may receive from processor 110 of FIG. 1 a request to execute a command on data in memory systems 115 of FIGS. 3A-3B. At block 610, processing elements 315 of FIGS. 3A-3B may access data from one (or more) of CXL memory modules 310 of FIGS. 3A-3B. As discussed above, CXL memory modules 310 of FIGS. 3A-3B might include processing elements 315 of FIGS. 3A-3B, or may be CXL memory modules without processing elements 315 of FIGS. 3A-3B. At block 615, processing elements 315 of FIGS. 3A-3B may execute the command. Finally, at block 620, accelerators 410 of FIGS. 4A-4B (or processing elements 315 of FIGS. 3A-3B) may send a response to processor 110 of FIG. 1, informing processor 110 of FIG. 1 that the command has been executed.

Figure 7:
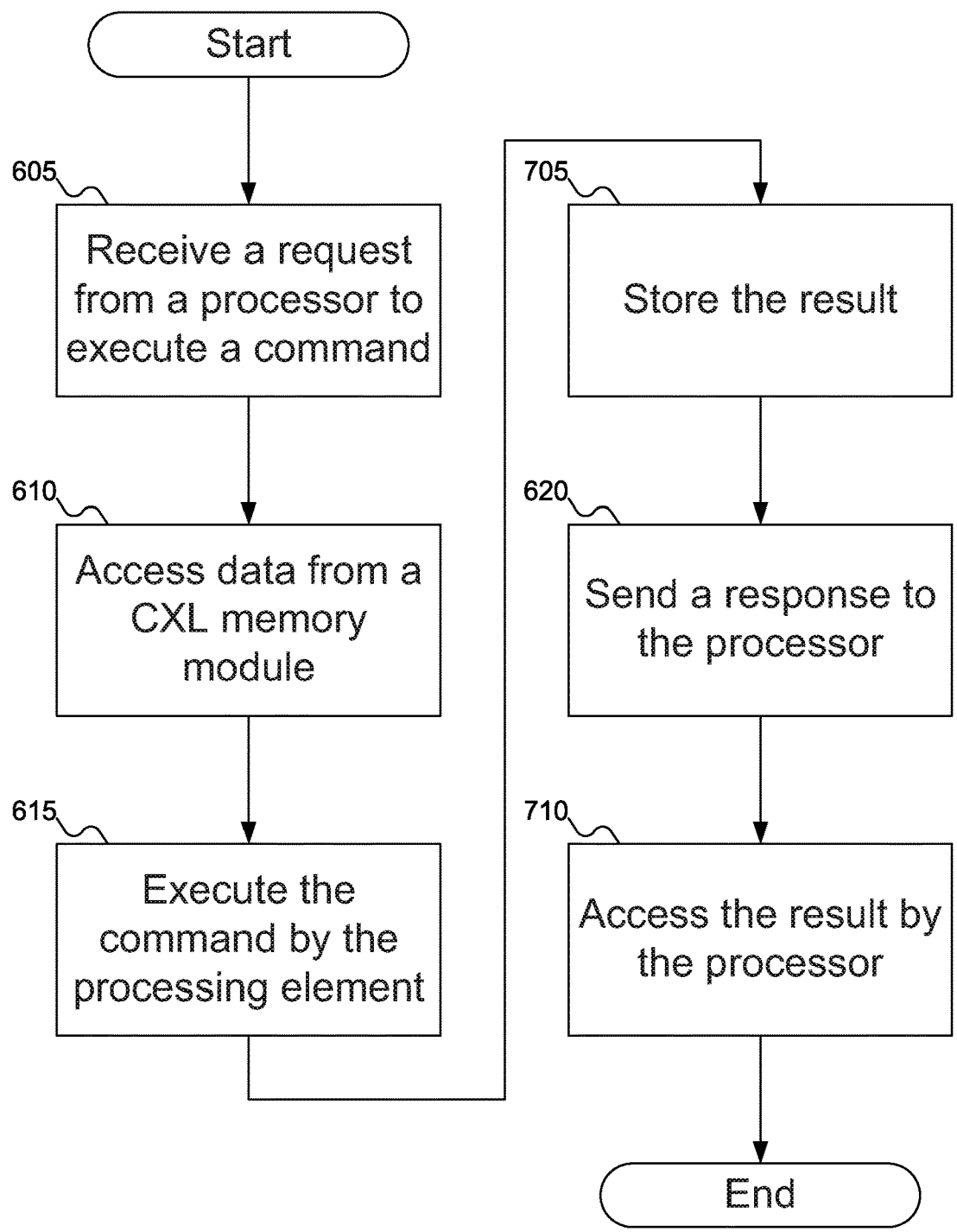
FIG. 7 shows an alternative flowchart of an example procedure for performing near data processing in the memory systems of FIGS. 3A-3B, according to embodiments of the disclosure.

FIG. 7 shows an alternative flowchart of an example procedure for performing near data processing in memory systems 115 of FIGS. 3A-3B, according to embodiments of the disclosure. FIG. 7 is similar to FIG. 6, but with some added elements. In FIG. 7, at block 605, accelerators 410 of FIGS. 4A-4B (or processing elements 315 of FIGS. 3A-3B)

may receive from processor 110 of FIG. 1 a request to execute a command on data in memory systems 115 of FIGS. 3A-3B. At block 610, processing elements 315 of FIGS. 3A-3B may access data from one (or more) of CXL memory modules 310 of FIGS. 3A-3B. As discussed above, CXL memory modules 310 of FIGS. 3A-3B might include processing elements 315 of FIGS. 3A-3B, or may be CXL memory modules without processing elements 315 of FIGS. 3A-3B. At block 615, processing elements 315 of FIGS. 3A-3B may execute the command. At block 705, processing elements 315 of FIGS. 3A-3B may store the results of the command: for example, the results may be stored in one of CXL memory modules 310 of FIGS. 3A-3B, or in output buffer 520 of FIG. 5. At block 620, accelerators 410 of FIGS. 4A-4B (or processing elements 315 of FIGS. 3A-3B) may send a response to processor 110 of FIG. 1, informing processor 110 of FIG. 1 that the command has been executed. Finally, at block 710, processor 110 of FIG. 1 may access the results from where the results were stored by processing elements 315 of FIGS. 3A-3B. Processor 110 of FIG. 1 may access the results using a CXL link with the appropriate CXL memory module(s) 310 of FIGS. 3A-3B, or by using other links (for example, Dual Data Rate (DDR) memory accesses).

Figure 8:
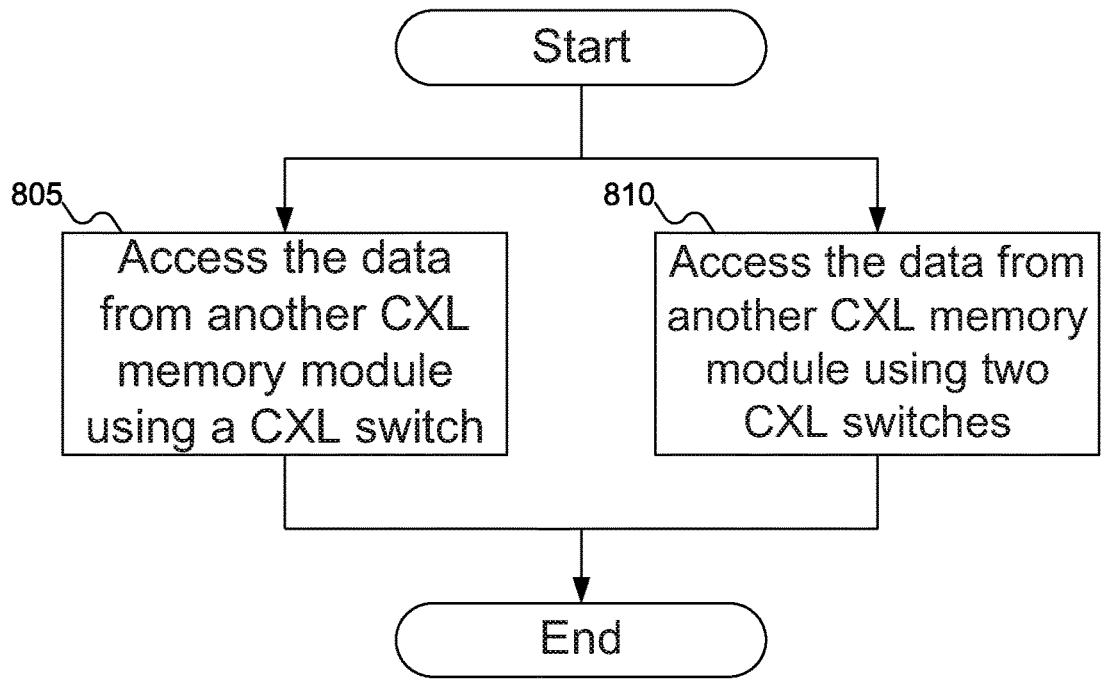
FIG. 8 shows a flowchart of an example procedure for accessing data from a memory module in the memory systems of FIG. 3A-3B, according to embodiments of the disclosure.

FIG. 8 shows a flowchart of an example procedure for accessing data from a memory module in memory systems 115 of FIG. 3A-3B, according to embodiments of the disclosure. In FIG. 8, at block 805, processing elements 315 of FIGS. 3A-3B may access data from another CXL memory module 310 of FIGS. 3A-3B connected to a common CXL switch 305 of FIGS. 3A-3B. Alternatively, at block 810, processing elements 315 of FIGS. 3A-3B may access data from another CXL memory module 310 of FIGS. 3A-3B connected to another CXL switch 305 of FIGS. 3A-3B using multiple CXL switches 305 of FIGS. 3A-3B (and possibly processor 110 of FIG. 1 as well).

In FIGS. 6-8, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include a cache-coherent interconnect memory system that may include a processing element. The processing element may be able to access data using a cache-coherent interconnect link, such as a CXL link, with memory modules, which may offer the technical advantage of a higher bandwidth than a link used by the host processor. Using a cache-coherent interconnect link may offer the technical advantage of not competing with other links used by the host processor to access data from the memory system.

The memory system may offer the technical advantage of scalability, as CXL memory modules may be added to the memory system to increase the available storage, even without the additional CXL memory modules necessarily supporting near data processing themselves. Further, the memory system may offer the technical advantage of accessing data from other CXL storage elements, such as a CXL storage device.

Genomics analysis is becoming more and more important and getting more and more closely related to daily life, because it is helpful to the understanding of complex human disease, precise medical care, wildlife conservation, and so on. For example, genomics analysis may be useful in understanding and designing optimal drug cocktail for cancer-causing mutations. In addition, genomics analysis helps a lot in dealing with the global pandemic Coronavirus Disease 2019 (COVID-19). However, with the rapid development of the Next Generation Sequencing (NGS) technology and the large amount of sequencing data required from precise medicine, the growth speed of genomics data is much faster than Moore's law, putting forward great challenges for genomics analysis.

Due to the time-consuming fact of genomics analysis, researchers are paying more and more attention to its hardware acceleration. Because of the large amount of data involved, simple computing operations, and the memory-bound features, many applications in genomics analysis are well suited for Near-Data-Processing (NDP). Many different NDP approaches are explored to accelerate different applications in genomics analysis.

Based upon the protocol and hardware of the Compute Express Link (CXL) protocol, two NDP accelerators (which may be termed CXL-Genome) for genomics analysis may be proposed. First, instead of focusing on a single application, CXL-Genome may be used for multiple applications in genomics analysis. Second, CXL-Genome may avoid consuming bandwidth of the Dual Data Rate (DDR) channel. There may be no side-effect on performance of the host. Third, the CXL interface, which may have a higher bandwidth than the DDR channel, may be used for inter-Dual In-Line Memory Module (DIMM) communication in CXL-Genome, may relieve issues of bandwidth bottleneck of inter-DIMM communications. Fourth, memory expansion may be supported in CXL-Genome. Regular CXL-DIMM memory modules may be used as memory in CXL-Genome. Fifth, as memory disaggregation may become a trend with the adoption of the CXL, CXL-Genome may provide improved scalability and adaptability than DIMM based accelerators for genomics analysis.

CXL-Genome, as shown in FIGS. 3A-3B, may accelerate multiple applications and be used in different scenarios.

The CXL protocol may be leveraged to enable memory expansion with CXL-DIMMs for accelerators. This idea may be implemented in CXL-Genome to improve its scalability and adaptability, but this idea can be used for other accelerators as well.

The CXL-Genome of FIGS. 3A-3B may achieve efficient memory access as compared with the regular CXL-DIMMs. Furthermore, CXL-Genome may support local atomic memory operations, which may be useful to many other applications as well. In addition, data packing/unpacking may improve bandwidth utilization and reduction on energy consumption.

Workload balance, data placement, and address mapping may be addressed with proposed centralized task scheduling, hierarchy aware data placement, and location and application aware hybrid address mapping.

Genomics analysis may examine the foundation of human disease understanding, precise medical care, wildlife conservation, and so on. There may be a few applications within a typical genomics analysis pipeline. Most accelerators for genomics analysis focus on a single application. CXL-Genome may be used to accelerate different algorithms for at least three memory bound applications in genomics analysis:

DNA seeding: DNA seeding, as the bottleneck stage in DNA alignment, refers to the process of matching seeds (short DNA sub-sequences) back to the long reference genome. DNA seeding algorithms may pre-build an index of the reference genome to speed up the seed locating process. FM-index and Hash-index may be the two mainstream seeding indexes used by modern DNA aligners. Both of those two methods involve simple compute operations, i.e., addition and hash, and involve lots of random memory access, thus they may be suitable for NDP acceleration.

k-mer counting: k-mer counting refers to the process of counting the occurrences of DNA sub-strings with length of among the sequencing data, i.e., sequenced reads. k-mer counting is useful and time-consuming in many genomics applications, such as error correction and de novo genome assembly. The major compute operations involved in k-mer counting may be only hash and addition, while k-mer counting involves lots of fine-grained random memory access due to its frequent access to the Bloom Filters and Hash table. Thus, k-mer counting may also be suitable for NDP acceleration.

DNA pre-alignment: After finding candidate matching locations for DNA alignment after DNA seeding, seed extension may be performed to check the similarity between the read segment extracted at those candidate locations and the long reference genome. However, the seed extension may be computationally expensive and time-consuming. To reduce the amount of candidate matching locations needed to be examined in the seed extension stage, a filtering method called DNA pre-alignment may be used by read mappers. DNA pre-alignment determines if a candidate matching location is valid by counting the number of matching DNA bases near the candidate matching location. The major compute operations in DNA pre-alignment are simple bit-wise comparison and addition. Similar to DNA seeding and k-mer counting, DNA pre-alignment may also be a candidate for NDP acceleration.

Compute Express Link (CXL): CXL is an open industry standard interconnect. CXL offers high-bandwidth and low-latency connectivity between the host processor and devices such as smart I/O devices, accelerators, and memory buffers. CXL enables cache coherency and memory semantics for heterogeneous processing and memory systems for optimized performance in evolving usage models. In addition, CXL may support memory access in cache line granularity, i.e., 64 Bytes, and switching to enable fan-out to multiple devices, which may be useful to memory expansion.

There are three dynamically multiplexed sub-protocols on a single CXL link:

CXL.io: Based on the Peripheral Component Interconnect Express (PCIe) specification, and related to device discovery, configuration, register access, interrupts, etc.

CXL.cache: Enable the CXL devices to access the memory of the host processor.

CXL.mem: Enable the host processor to access memory of the CXL devices.

Three example usage cases enabled by CXL are listed below:

Type 1 device: Caching devices and accelerators without their own device memory, such as Network Interface Controller (NIC). As for the protocols, CXL.io and CXL.cache may be involved for the type 1 devices.

Type 2 device: Accelerators with their own device memory, such as GPU. As for the protocols, all three sub-protocols in CXL may be involved for the type 2 devices.

Type 3 device: Memory buffer, such as memory expansion for the host processor. As for the protocols, CXL.io and CXL.mem may be involved for the type 3 devices.

The goal of the CXL-Genome of FIGS. 3A-3B is to utilize the CXL protocol and hardware, build multi-application accelerators for genomics analysis, provide better performance, and improve scalability as well as adaptability.

To this end, two types of CXL-Genome are identified: one using processing elements in a CXL switch, and one using processing elements in the CXL DIMM. No modification to the cost-sensitive DRAM dies may be needed for either type of CXL-Genome.

When CXL-Genome may be implemented in a CXL switch as shown in FIG. 3A, both the compute logics and control logics may be integrated within the CXL-switch. Unmodified CXL-DIMMs may be used as memory expansion. As for the computation, a NDP module capable of accelerating multiple applications in genomics analysis may be added to the CXL-switch. As for the memory, CXL-Genome may leverage the high memory bandwidth to CXL-DIMMs provided by the CXL links without interfering with the DDR bandwidth of the host. As for the communication, CXL-buses may be added in the CXL-switch to reduce data movement and support data routing.

When CXL-Genome may be implemented in a CXL switch as shown in FIG. 3A, there may be no need to fabricate a dedicated accelerator with the CXL interface and plug it into a CXL slot. In addition, memory expansion may be easy and convenient with the use of unmodified CXL-DIMMs.

When CXL-Genome may be implemented in a CXL-DIMM as shown in FIG. 3B, the compute logics may be integrated into a customized CXL-DIMM based accelerator (which may be termed a CXLG-DIMM), while the control logics may be separated into either or both of the CXL-switch and CXLG-DIMM. Unmodified CXL-DIMMs may be used as memory expansion for CXL-Genome. As for the computation, the NDP module may be placed within the CXLG-DIMM to leverage the high intra-DIMM bandwidth. As for the memory, besides the rank-level parallelism within the DIMM, similar to MEDAL, CXL-Genome may provide an individual Chip Select (CS) signal to different DRAM chips to enable fine-grained memory access and fully utilize the available memory bandwidth. As for the communication, CXL-buses may be added in the CXL-switch to reduce data movement and support data routing.

When CXL-Genome may be implemented in a CXL-DIMM as shown in FIG. 3B, CXL-Genome may leverage higher intra-DIMM memory bandwidth. Second, it may be convenient and easy to scale the computational capability in CXL-Genome by adding more CXLG-DIMMs into the system. Third, no application-specific logics may be needed in the CXL-switch. The control logics in the CXL-switch may be general purpose and can be used for other accelerators/applications as well.

The high-level architecture of CXL-Genome as shown in FIG. 3A may include the NDP module, the CXL-Buses, and the Bus Controller as part of the CXL-switch.

The NDP module may include various components:

Depacker: The Depacker may unpack and separate the fine-grained data coming in from remote memory requests. After the unpacking process finishes, the Depacker may forward the data to the Input Buffer.

Input Buffer: The Input Buffer may receive inputs to the NDP module, including remote memory requests from other CXLG-DIMMs and data back from local/remote memory requests. For remote memory requests from other CXLG-DIMMs, the requests may be forwarded to the DIMM-side Memory Controller (MC) and may wait to be issued out there. For data back from local/remote memory re-quests, the data may be passed to the Input Buffer from the Depacker. Then, the data may be forwarded to the Task Scheduler and the corresponding data statuses in the Task Scheduler are set as "Ready".

Task Scheduler: The Task Scheduler may store the inactive tasks, including both the new tasks read out from memory and the tasks waiting for operands to be ready. New tasks may be read out from memory, if the Task Scheduler finds that there are not enough tasks in queue to be processed. Those new tasks may be assigned to processing elements (PEs) that need more tasks to process. For the tasks waiting for operands, PEs may push them back into the Task Scheduler, if the operands are not ready. When the related memory requests complete, the statuses of the operands are set as "Ready", and these tasks may be pushed back to the PEs to be processed.

PE: Multiple PEs may be included in the NDP module. To reduce the hardware overhead, the major operations in the applications and algorithms may be analyzed for the desired accelerations. Herein, it may be shown that those applications and algorithms share some basic operations. Then, a design for a configurable PE may be shown, which consists of some basic computing units. Acceleration of target applications and algorithms in genomics analysis can be achieved by appropriate configuration of those basic computing units. In some embodiments of the disclosure, PEs may be able to accelerate four algorithms of three different applications in genomics analysis, including DNA seeding, K-mer counting, and DNA pre-alignment, making CXL-Genome suitable for different usage scenarios in genomics analysis. Also, PEs may also help to perform atomic memory operations in CXL-Genome.

As for the input, tasks from the Task Scheduler may be received. As for the output, memory requests and final results may be sent to the Address Translator to get the physical addresses. If the active task in the PE is waiting for memory requests, to fully utilize available hardware resource and improve computational efficiency, the PE may put that task into the Task Scheduler and the corresponding data statuses of the operands belonging to this task may be set as "Not Ready". At the same time, the PE may switch to process another waiting task, whose operands are ready.

Address Translator: The Address Translator may receive output memory requests from the PEs and translates the memory requests into their physical addresses. If the destination of a memory request is a CXL-DIMM connected to this CXL-switch, the Address Translator may send the memory request to the Switch-side MC, otherwise, the memory request may be forwarded to the Switch-side MC on the target CXL-switch.

Switch-side Memory Controller: In some embodiments of a CXL-Genome, the Switch-side MC in the NDP module may be responsible for maintaining the DRAM states and dealing with memory requests related to the CXL-DIMMs connected with this switch, eliminating unnecessary traffic to the host. All memory requests related to those CXL-DIMMs first may be gathered in the Switch-side MC. Then those memory requests may be issued out there.

Packer: The Packer may pack fine-grained data together before sending them to the Output Buffer, improving bandwidth utilization and reducing energy consumption.

Output Buffer: The Output Buffer may receive memory requests from the Packer. The memory requests may be sent to their destination when the communication resources needed are available.

Multiplexer (MUX): The MUX may control routing of the input and the output to the NDP module.

Besides the NDP module, the CXL-Buses and the Bus Controller may also be added to the CXL-switch:

CXL-Buses: CXL-Buses may include three channels for request, response, and data. CXL-Buses may be added to the CXL-switch to support efficient communication between different Virtual CXL Switches (VCSs) within the same CXL-switch and the customized switch logics, eliminating unnecessary communication between the CXL-switch and the host.

Bus Controller: The Bus Controller may be responsible for the regulation of communication and data routing within the CXL-switch.

The high-level architecture of CXL-Genome shown in FIG. 3B may include customized CXL-DIMM based accelerators, i.e., CXLG-DIMMs. Compared with CXL-Genome as shown in FIG. 3A, the CXLG-DIMM of FIG. 3B may include the NDP module. Most of the components in the NDP module may be the same as discussed above, except that the MC in the NDP module may become the DIMM-side MC. The DIMM-side MC may be in charge of issuing memory requests to local DRAM chips in the CXLG-DIMM, including both memory requests generated from local PEs and remote memory requests sent from other CXLG-DIMMs. All memory requests related to those local DRAM chips may first gather in the DIMM-side MC.

Then those memory requests may be issued out there.

In the high-level architecture of CXL-Genome shown in FIG. 3B, the NDP module may be removed from the CXL switch and three components—the Atomic Engine, the Switch-side MC, and the Packer/Depacker—may be added. The Bus Controller may remain the same.

Atomic Engine: The Atomic Engine may collaborate with the Switch-side MC to perform atomic memory operations. Initially, the Switch-side MC issues memory requests to bring back the target data for the atomic memory operations. Next, the Switch-side MC forwards data may require atomic memory operations to the Atomic Engine. Then, required atomic memory operations may be performed within the Atomic Engine. After the atomic memory operations have been completed, the result may be sent back to the Switch-side MC. Finally, the Switch-side MC may write the final results back to memory.

Switch-side Memory Controller: Because there might be multiple CXLG-DIMMs belonging to different VCSs within a CXL-switch and those CXLG-DIMMs may issue their own memory requests independently, a centralized MC to manage all those memory requests and maintain the DRAM states may be used. Thus, the Switch-side MC may be added into the CXL-switch. The Switch-side MC may be responsible for maintaining the DRAM states and dealing with memory requests related to the CXL-DIMMs connected with this CXL-switch, eliminating unnecessary traffic to the host.

Packer/Depacker: Similar to the Packer and Depacker in the NDP module, the Packer/Depacker in the CXL-switch may also pack/unpack fine-grained data transferred via the CXL-switch before sending/after receiving them to improve bandwidth consumption and reduce energy consumption.

Because CXL-Genome as shown in FIGS. 3A-3B may support using regular CXL-DIMMs as memory expansion, which improves the scalability and adaptability of CXL-Genome, data in CXL-DIMMs may need to be accessible for the NDP module. A challenge in efficiently supporting memory access to the regular CXL-DIMMs from the NDP module is about the redundant data movement between the host and the CXL-switch.

When CXL-Genome as shown in FIG. 3A is used, because CXL is a coherent protocol, the memory requests, response, and data to/from the CXL-DIMMs might need to go through the host with the naive implementation. To address this issue, the related memory space in the CXL- DIMMs may be set as device memory and leverage the CXL protocol to set the NDP module on the CXL-switch to the device-biased mode. According to the CXL protocol, when set to the device-biased mode, the accelerators can access the device memory without inquiring the host. Since the memory space in the CXL-DIMMs may be set as device memory, the NDP module on the CXL-switch can access the CXL-DIMMs directly without inquiring the host. Because a MC is needed to maintain the DRAM states of different CXL-DIMMs and issue memory requests, except for no response message is needed, the memory requests and data may still go through the host. To remove those unnecessary data movement, the Switch-side MC and CXL-Buses may be added to the CXL-switch to enable local memory issuing and data routing. In CXL-Genome as shown in FIG. 3A, after a step-by-step design optimization, redundant data movement between the host and the CXL-switch may be eliminated and efficient memory access to regular CXL-DIMMs may be achieved.

When CXL-Genome as shown in FIG. 3B is used, traffic of memory access to regular CXL-DIMMs with the naive implementation might be used. memory space in the CXL-DIMMs may be set as device memory and the CXLG-DIMMs may be set to the device-biased mode. There might be multiple CXLG-DIMMs belonging to different VCSs within the same CXL-switch and those CXLG-DIMMs issue memory requests to the CXL-DIMMs independently. A centralized MC to manage the all those memory requests from different CXLG-DIMMs and maintain the DRAM states of the CXL-DIMMs may be used to manage such memory requests. Thus, the Switch-side MC and CXL-Buses may also be added to the CXL-switch to support localized memory management and data routing. In CXL-Genome as shown in FIG. 3B, after a step-by-step design optimization, redundant data movement between the host and the CXL-switch may be eliminated and efficient memory access to regular CXL-DIMMs may be achieved.

To improve performance and leverage the available task-level parallelism within different applications in genomics analysis, multi-tasking may be utilized. However, with multi-tasking, Read-Modify-Write (RMW) data race, i.e., simultaneously reading and updating the memory may lead to incorrect results, is a concern. For example, during parallel processing of k-mer counting, multiple tasks may try to read, increase, then write back the same k-mer counter at the same time. Undetermined order of those operations may lead to incorrect value of the k-mer counter.

The atomic memory operations may solve the issue of RMW data race, and also reduce traffic and bandwidth consumption. In addition, the atomic memory operations may be useful to the acceleration of many different applications. For these reasons, the atomic memory operations in CXL-Genome may be enabled to address the challenge of RMW data race. For CXL-Genome as shown in FIG. 3A, no extra components may be needed. For CXL-Genome as shown in FIG. 3B, an Atomic Engine may be added into the CXL-switch.

For the workflow of performing atomic memory operations in CXL-Genome as shown in FIG. 3A: 1. The Switch-side MC in the NDP module issues memory may request to the target CXL-DIMM to bring back the target data. 2. The data may be brought back to the CXL-side MC in the NDP module. 3. The data may also be forwarded to the PEs available. 4. The arithmetic operations may be performed within the available PEs. 5. The results after the arithmetic operations may be sent back to the Switch-side MC in the NDP module from the PEs. 6. The Switch-side MC in the NDP module may issue memory request to write back the result to its original location.

The workflow of performing atomic memory operations in CXL-Genome as shown in FIG. 3B is similar to the workflow for CXL-Genome as shown in FIG. 3A. One difference of performing atomic memory operations is that the arithmetic operations may be performed in PEs in CXL-Genome as shown in FIG. 3A, while in CXL-Genome as shown in FIG. 3B, those arithmetic operations may be performed in the Atomic Engine.

Applications in genomics analysis may involve fine-grained random memory access, e.g., 32 Bytes for DNA seeding and even 1 bit for k-mer counting. However, the default data transfer granularity in CXL is 64 Bytes, which is much higher than the amount of the actually useful data and leads to unnecessary bandwidth and energy consumption. One way to address this issue may be to discard the useless data and pack useful data together before sending the data. After receiving the data, the packed fine-grained data may be unpacked and separated. This approach may eliminate the transfer and movement of the useless data, leading to reduction in bandwidth and energy consumption.

The data packing and unpacking may be performed within the Packer and Depacker. In CXL-Genome as shown in FIG. 3A, the Packer and Depacker may be in the CXL-switch. In CXL-Genome as shown in FIG. 3B, both the CXLG-DIMMs and the CXL-switch may contain the Packer and Depacker to reduce or eliminate unnecessary data movement as much as possible. In addition, because the CXL-switch acts as a transfer hub, the Packer and Depacker on the CXL-switch may also unpack, regroup, and repack data according to their destination.

To better leverage data locality and reduce data movement, a hierarchy aware data placement may be used. One idea for hierarchy aware data placement is to make full utilization of the local memory, which provides shorter latency and higher bandwidth. Thus, in CXL-Genome, data may be placed to memory locations corresponding to high level in the memory hierarchies.

To enable efficient memory access, address mapping may be used in the NDP architectures. Different from providing one fixed address mapping scheme for the entire accelerator, location and application aware hybrid address mapping scheme may be used due to two reasons below:

In CXL-Genome as shown in FIGS. 3A-3B, the granularity of memory access may be diverse. The CXLG-DIMMs may support individual chip select to provide chip-level memory accessibility, which could be 4 Bytes if there are 16 DRAM chips per rank. On the other hand, the CXL-DIMMs may be unmodified commercial memory components for memory expansion in CXL-Genome. Thus, the granularity of memory access to the CXL-DIMMs may be 64 Bytes.

The amount of data needed per memory request for different applications in genomics analysis may vary. For example, the amount of data needed per memory request for DNA seeding could be 32 Bytes, but the amount of data needed per memory request for k-mer counting might be only 1 bit.

As the name indicates, location and application aware hybrid address mapping may determine the address mapping scheme on both data location and application type. In addition, multiple address mapping schemes may co-exist in the system.

The default address mapping scheme may interleave data in continuous address between different channels and ranks to fully utilize available memory bandwidth from different channels and ranks for the host. For the CXL-DIMMs, the coarse-grained NDP aware address mapping may be used. Instead of interleaving data, the coarse-grained NDP aware address mapping may aggregate data within each rank locally to enable efficient local memory access and reduce data movement. For the CXLG-DIMMs, if multiple continuous fine-grained memory accesses are needed to access the target data, e.g., DNA seeding, a fine-grained and coalesced address mapping may be used. The fine-grained and coalesced address mapping may support fine-grained memory access and may aggregate data within each DRAM chip to better leverage locality. On the other hand, if a single fine-grained memory access is more than enough to access the target data, e.g., k-mer counting, the fine-grained and distributed address mapping may be used. The coarse-grained and distributed address mapping may also support fine-grained memory access, while it distributes data to different DRAM chips as much as possible to better leverage chip-level bandwidth and parallelism.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a memory system, comprising:
a first cache-coherent interconnect memory module;
a second cache-coherent interconnect memory module;
a cache-coherent interconnect switch connecting the first cache-coherent interconnect memory module, the second cache-coherent interconnect memory module, and a processor; and a processing element to process a data stored on at least one of the first cache-coherent interconnect memory module and the second cache-coherent interconnect memory module.

Statement 2. An embodiment of the disclosure includes the memory system according to statement 1, wherein:
the first cache-coherent interconnect memory module includes a first cache-coherent interconnect Dual In-Line Memory Module (DIMM); and
the second cache-coherent interconnect memory module includes a second cache-coherent interconnect DIMM.

Statement 3. An embodiment of the disclosure includes the memory system according to statement 1, wherein:
the first cache-coherent interconnect memory module includes a first Compute Express Link (CXL) memory module;
the second cache-coherent interconnect memory module includes a second CXL memory module; and
the cache-coherent interconnect switch includes a CXL switch.

Statement 4. An embodiment of the disclosure includes the memory system according to statement 3, further comprising:
a third CXL memory module;
a fourth CXL memory module; and
a second CXL switch connecting the third CXL memory module, the fourth CXL memory module, and the processor.

Statement 5. An embodiment of the disclosure includes the memory system according to statement 4, wherein the CXL switch is configured to communicate with the second CXL switch.

Statement 6. An embodiment of the disclosure includes the memory system according to statement 5, wherein the CXL switch is configured to communicate with the second CXL switch using the processor.

Statement 7. An embodiment of the disclosure includes the memory system according to statement 3, wherein the first CXL memory module includes the processing element.

Statement 8. An embodiment of the disclosure includes the memory system according to statement 7, wherein the first CXL memory module includes an accelerator, the accelerator including the processing element.

Statement 9. An embodiment of the disclosure includes the memory system according to statement 8, wherein the accelerator further includes a second processing element.

Statement 10. An embodiment of the disclosure includes the memory system according to statement 8, wherein the accelerator further includes a task scheduler to schedule an operation for the processing element or the second processing element.

Statement 11. An embodiment of the disclosure includes the memory system according to statement 8, wherein the accelerator further includes a memory controller to access the data from the first CXL memory module or the second CXL memory module.

Statement 12. An embodiment of the disclosure includes the memory system according to statement 11, wherein the memory controller is configured to access a second data from a third CXL memory module connected to a second CXL switch using the CXL switch and the processor.

Statement 13. An embodiment of the disclosure includes the memory system according to statement 8, wherein the accelerator further includes an input buffer.

Statement 14. An embodiment of the disclosure includes the memory system according to statement 8, wherein the accelerator further includes an output buffer.

Statement 15. An embodiment of the disclosure includes the memory system according to statement 7, wherein:
the first CXL memory module includes a first CXL interface;
the second CXL memory module includes a second CXL interface; and
the CXL switch connects the first CXL memory module using the first CXL interface and the second CXL memory module using the second CXL interface.

Statement 16. An embodiment of the disclosure includes the memory system according to statement 1, wherein the processing element is configured to perform genomic analysis.

Statement 17. An embodiment of the disclosure includes a method, comprising:
receiving a request from a processor to execute a command on a processing element in a memory system;
accessing a data from a cache-coherent interconnect memory module of the memory system using a cache-coherent interconnect channel;
executing the command by the processing element; and
sending a response to the processor that the command has been executed by the processing element.

Statement 18. An embodiment of the disclosure includes the method according to statement 17, wherein the cache-coherent interconnect memory module includes a cache-coherent interconnect Dual In-Line Memory Module (DIMM).

Statement 19. An embodiment of the disclosure includes the method according to statement 17, wherein accessing the data from the cache-coherent interconnect memory module of the memory system using the cache-coherent interconnect channel includes accessing the data from a Compute Express Link (CXL) memory module of the memory system using a CXL channel.

Statement 20. An embodiment of the disclosure includes the method according to statement 19, wherein the CXL memory module includes the processing element.

Statement 21. An embodiment of the disclosure includes the method according to statement 19, wherein a second CXL memory module includes the processing element.

Statement 22. An embodiment of the disclosure includes the method according to statement 21, wherein accessing the data from the CXL memory module of the memory system using the CXL channel includes accessing the data using a CXL switch.

Statement 23. An embodiment of the disclosure includes the method according to statement 22, wherein the CXL switch connects the CXL memory module and the second CXL memory module.

Statement 24. An embodiment of the disclosure includes the method according to statement 21, wherein:
the CXL switch connects the CXL memory module and the processor;
a second CXL switch connects the second CXL memory module and the processor; and
accessing the data from the CXL memory module of the memory system using the CXL channel includes accessing the data using the CXL switch and the second CXL switch.

Statement 25. An embodiment of the disclosure includes the method according to statement 19, wherein:

executing the command by the processing element includes generating a result; and the method further comprises storing the result in the CXL memory module.

Statement 26. An embodiment of the disclosure includes the method according to statement 25, further comprising accessing the result from the CXL memory module by the processor.

Statement 27. An embodiment of the disclosure includes an article, comprising a non-transitory storage medium, the non-transitory storage medium having stored thereon instructions that, when executed by a machine, result in:

receiving a request from a processor to execute a command on a processing element in a memory system;

accessing a data from a cache-coherent interconnect memory module of the memory system using a cache-coherent interconnect channel;

executing the command by the processing element; and sending a response to the processor that the command has been executed by the processing element.

Statement 28. An embodiment of the disclosure includes the article according to statement 27, wherein the cache-coherent interconnect memory module includes a cache-coherent interconnect Dual In-Line Memory Module (DIMM).

Statement 29. An embodiment of the disclosure includes the article according to statement 27, wherein accessing the data from the cache-coherent interconnect memory module of the memory system using the cache-coherent interconnect channel includes accessing the data from a Compute Express Link (CXL) memory module of the memory system using a CXL channel.

Statement 30. An embodiment of the disclosure includes the article according to statement 29, wherein the CXL memory module includes the processing element.

Statement 31. An embodiment of the disclosure includes the article according to statement 29, wherein a second CXL memory module includes the processing element.

Statement 32. An embodiment of the disclosure includes the article according to statement 31, wherein accessing the data from the CXL memory module of the memory system using the CXL channel includes accessing the data using a CXL switch.

Statement 33. An embodiment of the disclosure includes the article according to statement 32, wherein the CXL switch connects the CXL memory module and the second CXL memory module.

Statement 34. An embodiment of the disclosure includes the article according to statement 31, wherein:

the CXL switch connects the CXL memory module and the processor;

a second CXL switch connects the second CXL memory module and the processor; and accessing the data from the CXL memory module of the memory system using the CXL channel includes accessing the data using the CXL switch and the second CXL switch.

Statement 35. An embodiment of the disclosure includes the article according to statement 29, wherein:

executing the command by the processing element includes generating a result; and the non-transitory storage medium has stored thereon further instructions that, when executed by the machine, result in storing the result in the CXL memory module.

Statement 36. An embodiment of the disclosure includes the article according to statement 35, wherein the non-transitory storage medium has stored thereon further instructions that, when executed by the machine, result in accessing the result from the CXL memory module by the processor.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A memory system, comprising:
a first cache-coherent interconnect memory module;
a second cache-coherent interconnect memory module;
a cache-coherent interconnect switch connecting the first cache-coherent interconnect memory module, the second cache-coherent interconnect memory module, and a processor; and
a processing element to process a data stored on at least one of the first cache-coherent interconnect memory module and the second cache-coherent interconnect memory module to generate a second data,
wherein the processing element is included in the first cache-coherent interconnect memory module.

2. The memory system according to claim 1, wherein:
the first cache-coherent interconnect memory module includes a first cache-coherent interconnect Dual In-Line Memory Module (DIMM); and
the second cache-coherent interconnect memory module includes a second cache-coherent interconnect DIMM.

3. The memory system according to claim 1, wherein:
the first cache-coherent interconnect memory module includes a first Compute Express Link (CXL) memory module;
the second cache-coherent interconnect memory module includes a second CXL memory module; and
the cache-coherent interconnect switch includes a CXL switch.

4. The memory system according to claim 3, further comprising:
a third CXL memory module;
a fourth CXL memory module; and
a second CXL switch connecting the third CXL memory module, the fourth CXL memory module, and the processor.

5. The memory system according to claim 4, wherein the CXL switch is configured to communicate with the second CXL switch.

6. The memory system according to claim 3, wherein the first CXL memory module includes an accelerator, the accelerator including the processing element.

7. The memory system according to claim 6, wherein the accelerator further includes a second processing element.

8. The memory system according to claim 7, wherein the accelerator further includes a task scheduler to schedule an operation for the processing element or the second processing element.

9. The memory system according to claim 6, wherein the accelerator further includes a memory controller to access the data from the first CXL memory module or the second CXL memory module.

10. The memory system according to claim 9, wherein the memory controller is configured to access a second data from a third CXL memory module connected to a second CXL switch using the CXL switch and the processor.

11. The memory system according to claim 3, wherein:
the first CXL memory module includes a first CXL interface;
the second CXL memory module includes a second CXL interface; and
the CXL switch connects the first CXL memory module using the first CXL interface and the second CXL memory module using the second CXL interface.

12. The memory system according to claim 1, further comprising:
an input buffer to store a third data for use by the processing element, the third data received from the processor; and
an output buffer to store the second data, the second data based at least in part on the first data and the third data.

13. A method, comprising:
receiving a request from a processor to execute a command on a processing element in a cache-coherent interconnect memory module in a memory system;
accessing a data from the cache-coherent interconnect memory module of the memory system using a cache-coherent interconnect channel;
executing the command by the processing element in the cache-coherent interconnect memory module; and
sending a response to the processor that the command has been executed by the processing element.

14. The method according to claim 13, wherein the cache-coherent interconnect memory module includes a cache-coherent interconnect Dual In-Line Memory Module (DIMM).

15. The method according to claim 13, wherein accessing the data from the cache-coherent interconnect memory module of the memory system using the cache-coherent interconnect channel includes accessing the data from a Compute Express Link (CXL) memory module of the memory system using a CXL channel.

16. The method according to claim 15, wherein accessing the data from the CXL memory module of the memory system using the CXL channel includes accessing the data using a CXL switch.

17. The method according to claim 15, wherein:
the CXL switch connects the CXL memory module and the processor;
a second CXL switch connects the second CXL memory module and the processor; and
accessing the data from the CXL memory module of the memory system using the CXL channel includes accessing the data using the CXL switch and the second CXL switch.

18. The method according to claim 15, wherein:
executing the command by the processing element includes generating a result; and
the method further comprises storing the result in the CXL memory module.

19. The method according to claim 13, wherein executing the command by the processing element in the cache-coherent interconnect memory module includes executing the command on the data by the processing element in the cache-coherent interconnect memory module to generate a second data.

20. An article, comprising a non-transitory storage medium, the non- transitory storage medium having stored thereon instructions that, when executed by a machine, result in:
receiving a request from a processor to execute a command on a processing element in a cache-coherent interconnect memory module in a memory system;
accessing a data from the cache-coherent interconnect memory module of the memory system using a cache-coherent interconnect channel;
executing the command by the processing element in the cache-coherent interconnect memory module; and
sending a response to the processor that the command has been executed by the processing element.

21. The article according to claim 20, wherein accessing the data from the cache-coherent interconnect memory module of the memory system using the cache-coherent interconnect channel includes accessing the data from a Compute Express Link (CXL) memory module of the memory system using a CXL channel.

* * * * *